Oct. 31, 1933.   C. E. JOHNSON   1,932,737
PISTON RING
Filed May 31, 1932

Inventor
Charles E. Johnson
By Liverance & Van Antwerp
Attorneys

Patented Oct. 31, 1933

1,932,737

UNITED STATES PATENT OFFICE 1,932,737

PISTON RING

Charles E. Johnson, North Muskegon, Mich.

Application May 31, 1932. Serial No. 614,488

2 Claims. (Cl. 309—45)

This invention relates to piston rings and is concerned with a novel construction of oil draining ring for use particularly in internal combustion engines wherein the speed of rotation of the engine crank shaft is high with consequent rapid reciprocatory movements of the pistons. The ring of the present invention is designed to be of a simple, easily manufactured economical construction and one in which there is greater uniformity in the ring as to tension and wherein the bearing surface of the ring against the walls of the cylinder is ample, but not so wide as to render cutting through or partly through the film of oil on the cylinder walls hard to attain, whereby the collection and drainage of the oil through the ring is more perfectly obtained. At the same time at the upper and lower outer corner portions of the ring recesses for oil holding are produced thereby maintaining a most effective seal between the ring and the walls of the cylinder to prevent passage of exhaust gases or of the compressed fuel charge from the combustion chamber to the crank case of the engine.

An understanding of the invention may be had from the following description, taken in connection with the accompanying drawing, in which Fig. 1 is a plan view of a piston ring made in accordance with my invention.

Figure 1:
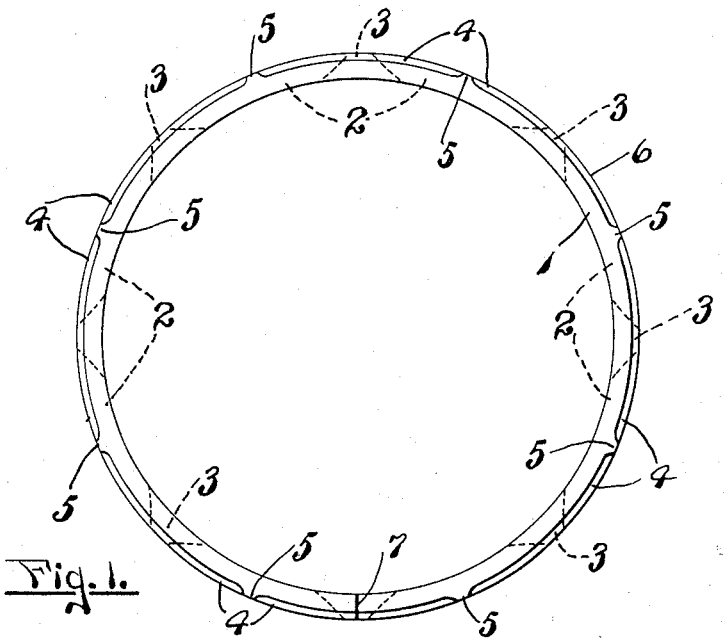
Figure 2:
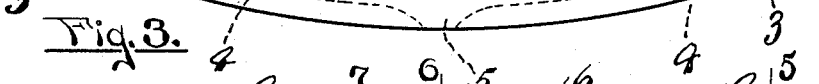
Fig. 2 is an edge view thereof.
Figure 3:
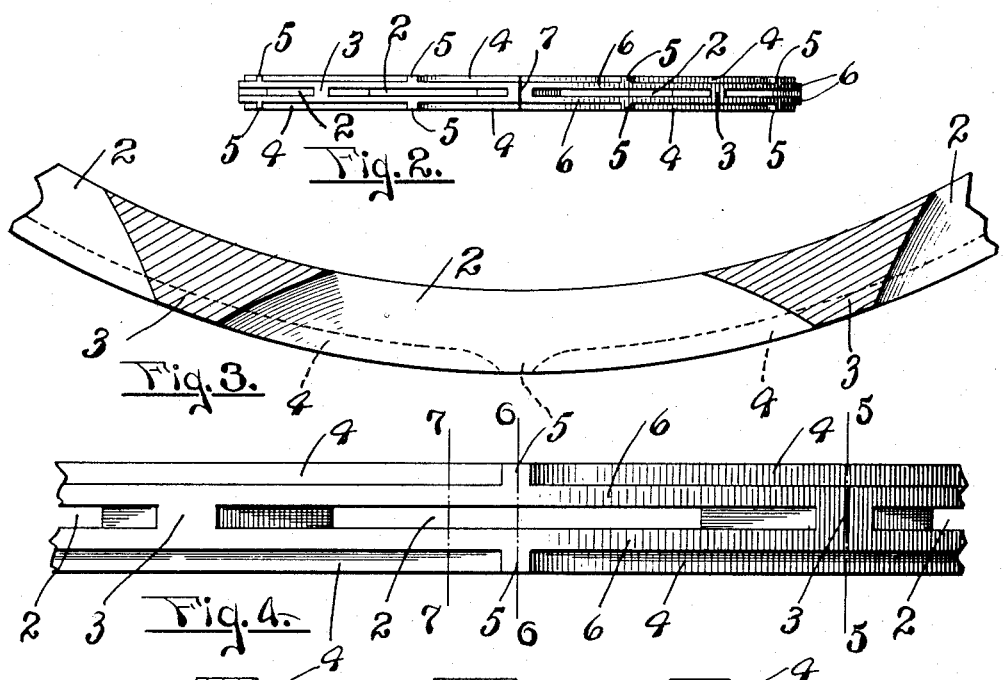
Fig. 3 is a fragmentary enlarged horizontal section between the opposed flat sides of the ring.
Figure 4:
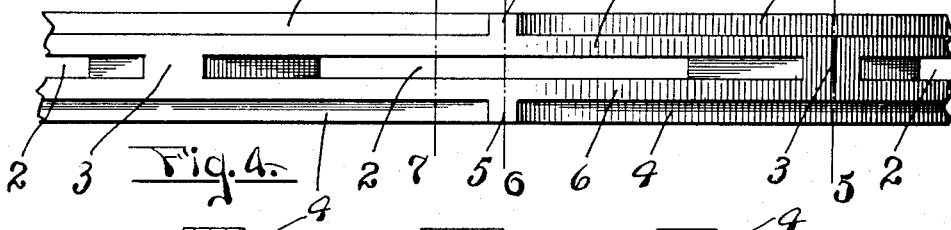
Figure 5:
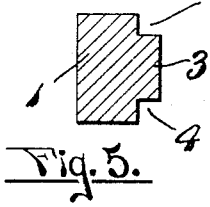
Figure 6:
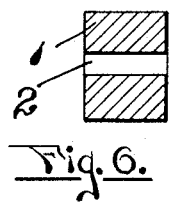
Figure 7:
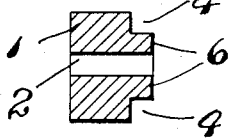

Fig. 4 is a fragmentary enlarged edge elevation of so much of the ring as is shown in Fig. 3, and Figs. 5, 6 and 7 are cross sections on the planes of lines 5—5, 6—6 and 7—7 of Fig. 4.

Like reference characters refer to like parts in the different figures of the drawing.

The ring 1 is made from the usual individual ring casting which is of uniform cross section and cast in a mold formed with an out-of-round pattern. The casting may have a segment removed at one side such that when the ends of the ring at such partings are brought together it will take a circular form, but when free to do so, will spring open at the parting made by the removing of such segment. Such ring casting after machining at its outer curved side and at its opposed flat sides provides what is known as the ordinary snap ring.

In my invention a snap ring made as described has a plurality of drainage slots 2 cut therethrough midway between the opposed flat sides of the ring. The slots 2 are sawed from the outer to the inner curved sides of the ring, using a circular saw, and are spaced from each other at their end leaving intermediate sections 3 of the ring between the adjacent ends of the slots 2.

At the upper and lower outer corner portions of the ring and around the same, grooves 4 are cut, preferably rectangular in shape. These grooves are located consecutively around the ring and are separated at adjacent ends by integral abutments 5. That is, the grooves 4 are not continuous but at periodic intervals around the ring are separated from each other by intermediate abutments 5, the outer sides of which are flush with the outer curved surface of the ring, the same as are the outer ends of the sections 3 previously described.

The abutments 5 are located around the ring substantially midway between the outer ends of the sections 3 which are located between the ends of the slots 2. This provides narrow ribs 6 separated from each other by the slots 2 which under the tension of the compressed ring, as it is in a cylinder, press into and cut through or partially through the film of oil with which a cylinder is coated in engine operation, and thus direct the oil into the slots 2 for drainage to ring groove, from which it is carried through passages from the bottom of the ring groove to the interior of the piston, as is the usual practice with oil collecting and conserving rings. The location of the abutments 5 midway between the integral sections 3 of the ring strengthens each section of the ring between any two parts 3, which without such abutments 5, would be considerably weakened by the cutting of the slots 2; and the weakened portions of the ring would be midway between said sections 3, and it is at these midway points that the strengthening abutments 5 appear.

The parting 7 in the ring is made through one of the sections 3, as shown, leaving no weak flanges at this point but providing a strong structure at the parting.

Moreover the ends of the abutments 5, as well as the outer ends of the parts 3, in addition to the outer curved surfaces of the rib 6, bear against the cylinder walls and together with the bearing of the abutments 5 against the upper and lower sides of the ring grooves in which the ring is seated, serve to prevent fluttering or rocking movement of the piston ring in operation. Such fluttering or rocking movement is particularly productive of blow-by, by which is meant the passage of products of combustion or of the compressed fuel charge past the piston from the combustion chamber to the engine crank case.

The slots 2 having straight parallel walls, and being of full width from the outer to inner curved sides of the ring, when oil is scraped from the cylinder walls it passes directly through said slots to the ring grooves without restriction. This eliminates substantially any danger of the slots clogging or filling up with carbon or any deposit in the ring grooves, which is liable to occur when the slots carrying the oil are of less width than outer collecting ring grooves with which the slots are connected, present in many types of piston rings now manufactured.

The recesses at 4 are also useful in collecting and retaining oil which helps to perfect the seal between the ring and the walls of the cylinder to thereby retain compression or exploded gases and prevent their passage or blowing by the piston. The construction of ring described is readily manufactured, simple and easy to construct and at low cost, and with it the several advantages recited are very satisfactorily attained.

The invention is defined in the appended claims and is to be considered comprehensive of all forms of structure coming within their scope.

I claim:

1. A split piston ring having a plurality of circumferentially spaced slots extending radially therethrough at substantially the medial portion of said ring, said slots comprising substantially parallel side walls and inwardly converging end walls, said ring also having two series of circumferentially spaced arcuate grooves in its outer periphery, one series being formed in the upper outer corner of said ring and the other in the lower outer corner, the termini of said grooves forming pairs of circumferentially spaced aligned projections having portions flush with the outer peripheral surface of said ring, one pair of said aligned projections being formed at substantially the mid portion of each of said slots.

2. A piston ring of the class described having a plurality of spaced slots therethrough from its outer to its inner curved sides, said ring also having grooves in its outer curved upper and lower corner portions, said grooves being interrupted by spaced apart projections extending from the body of the ring and integral therewith to the outer curved surface of the ring, all of said projections being spaced from the ends of the ring.

CHARLES E. JOHNSON.